US008479953B2

(12) United States Patent
Tachibana et al.

(10) Patent No.: US 8,479,953 B2
(45) Date of Patent: Jul. 9, 2013

(54) BEVERAGE DISPENSER

(75) Inventors: Yoshihisa Tachibana, Tokyo (JP); Takashi Nishiyama, Tokyo (JP); Kazuhide Saito, Osaka (JP); Kazuaki Mizukami, Osaka (JP); Hiroyuki Hashimoto, Osaka (JP); Takeshi Ishii, Osaka (JP); Hiroshi Yamamoto, Osaka (JP)

(73) Assignee: The Coca-Cola Company, Atlanta, GA (US)

( * ) Notice: Subject to any disclaimer, the term of this patent is extended or adjusted under 35 U.S.C. 154(b) by 509 days.

(21) Appl. No.: 12/669,786

(22) PCT Filed: Jul. 14, 2008

(86) PCT No.: PCT/JP2008/063216
§ 371 (c)(1),
(2), (4) Date: Jun. 21, 2010

(87) PCT Pub. No.: WO2009/014152
PCT Pub. Date: Jan. 29, 2009

(65) Prior Publication Data
US 2010/0276451 A1 Nov. 4, 2010

(30) Foreign Application Priority Data

Jul. 20, 2007 (JP) ................................ 2007-189019

(51) Int. Cl.
*B67D 7/74* (2010.01)
*B67D 7/80* (2010.01)
*F25D 3/00* (2006.01)

(52) U.S. Cl.
USPC ............... 222/129.1; 222/146.1; 222/146.6; 62/389

(58) Field of Classification Search
USPC .............. 222/146.1, 146.6, 129.1–129.4, 189.07–189.11, 190; 261/DIG. 7; 62/389, 62/390
See application file for complete search history.

(56) References Cited

U.S. PATENT DOCUMENTS 3,583,601 A * 6/1971 Ayers ................................ 222/1
4,201,558 A * 5/1980 Schwitters et al. ............... 62/70

(Continued)

FOREIGN PATENT DOCUMENTS

GB 2 404 371 2/2005
JP 57-194999 11/1982

(Continued)

OTHER PUBLICATIONS

Supplementary European Search Report and Written Opinion for related European Application No. 08778339.5 (PCT/JP2008063216) dated Apr. 27, 2011.
International Search Report from the Japanese Patent Office for International Application No. PCT/JP2008/063216 (Oct. 21, 2008).

*Primary Examiner* — Paul R Durand
*Assistant Examiner* — Vishal Pancholi
(74) *Attorney, Agent, or Firm* — Sutherland Asbill & Brennan LLP (57) ABSTRACT

A beverage dispenser capable of supplying a supercooled beverage without being influenced by a type of raw water. In various embodiments, the beverage dispenser includes a raw water treatment device that deaerates or filters raw water, a primary cooling device that cools the raw water to an ice point or so, and a secondary cooling device that cools the raw water into a supercooled state. In certain embodiments, the beverage dispenser further includes an anti-freezing liquid tank, a refrigerant circuit that cools the anti-freezing liquid to a supercooling temperature, and a brine circuit that circulates the anti-freezing liquid. According to certain aspects of the embodiments, a supercooled beverage can be quickly and reliably phase-changed to a different state when discharged to the outside.

18 Claims, 5 Drawing Sheets

U.S. PATENT DOCUMENTS

| | | | |
|---|---|---|---|
| 4,300,923 A * | 11/1981 | Skoli et al. | 96/218 |
| 5,140,832 A * | 8/1992 | Deininger et al. | 62/389 |
| 5,749,233 A * | 5/1998 | Adolfsson | 62/50.2 |
| 6,260,477 B1 * | 7/2001 | Tuyls et al. | 99/323.2 |
| 6,276,150 B1 * | 8/2001 | Nelson | 62/177 |
| 6,312,589 B1 * | 11/2001 | Jarocki et al. | 210/87 |
| 6,698,229 B2 * | 3/2004 | Renken et al. | 62/390 |
| 6,981,387 B1 | 1/2006 | Morgan | |

FOREIGN PATENT DOCUMENTS

| | | |
|---|---|---|
| JP | 11-104637 | 4/1999 |
| JP | 2001-325656 | 11/2001 |
| WO | WO 99/32409 | 7/1999 |

* cited by examiner

| | Experiment times | Supercooling successtimes | probabillity |
|---|---|---|---|
| Tap water of a certain town | 51 | 45 | 88.2 |
| Water filtered through a FU cartridge made by ORGANO | 44 | 21 | 47.7 |
| Water obtained by deaerating the water filtered through the FU cartridge | 47 | 47 | 100.0' |
| Water obtained by deaerating the tap water | 10 | 10 | 100.0' |
| Distilled water | 17 | 16 | 94.1 |
| Alkaki ion water | 27 | 25 | 92.6 |
| Water filtered through a reverse osmosis film | 35 | 35 | 100.0' |

FIG. 7

BEVERAGE DISPENSER

TECHNICAL FIELD

The present invention relates to a beverage dispenser which supplies a beverage brought into a supercooled state at a solidifying point or less and which releases the supercooled state in the outside to manufacture a sherbet-like beverage.

BACKGROUND ART

Heretofore, in a beverage dispenser which supplies a beverage to a cup and the like, a syrup supply line is drawn from a tank filled with a syrup as a beverage material, and a diluting water supply line is also disposed which dilutes the syrup at a predetermined ratio. In these syrup supply line and diluting water supply line, a syrup cooling coil and a diluting water cooling coil are interposed, respectively. These coils are immersed into a water tank in which cooling water is stored to cool the syrup and the diluting water flowing through the coils at a predetermined temperature. In consequence, the syrup and the diluting water cooled at the predetermined cooling temperature are mixed at nozzles, respectively, and discharged as a targeted beverage to the cup.

The beverage supplied by the above-mentioned constitution is all stored in the cup in a liquid state. Therefore, ice pieces are separately put into the cup to serve the beverage to a customer in a state in which the beverage can be maintained at a constant cooling temperature for a certain degree of time.

However, when the ice pieces are supplied to the cup, the only beverage around the floating ice pieces is cooled owing to heat of fusion. Therefore, it is difficult to uniformly cool the whole beverage in the cup. Moreover, as the ice pieces melt, concentration of the beverage decreases. It has therefore been difficult to serve the beverage in an appropriately cooled state.

To solve the problem, heretofore, a device including a beverage supercooling heat exchanger constituting a heat pump circuit (a refrigerant circuit) together with a water tank cooling heat exchanger which cools the cooling water stored in the water tank has been developed. The beverage cooled in the water tank is cooled at a temperature of or below a solidifying point of the beverage by the beverage supercooling heat exchanger, and the beverage is discharged to the cup as it is in a supercooled state to serve a sherbet-like beverage (see Patent Japanese Patent Application Laid-Open No. 2001-325656).

In this device, a flow rate of the beverage is controlled to discharge the beverage from the beverage supercooling heat exchanger while maintaining the beverage in a liquid-phase state even at the temperature which is not more than the ice point. Moreover, the beverage is momentarily phase-changed to ice owing to impact at a time when the beverage is discharged to the cup and the like. In consequence, the sherbet-like beverage having fluidity is supplied into the cup.

DISCLOSURE OF INVENTION

However, in the above-mentioned conventional technology, an appropriately supercooled state cannot be formed owing to an influence of the presence of impurity substances included in water, depending on a type of the water for use as diluting water. Moreover, in the beverage supercooling heat exchanger, supercooling cannot be maintained, and there is a high probability that a phase change to a solid phase frequently occurs. This causes a problem that the only syrup is supplied to the cup or the like and that the beverage cannot appropriately be supplied.

SUMMARY OF THE INVENTION

The present invention has been developed to solve the conventional technical problems, and an object thereof is to provide a beverage dispenser capable of appropriately and smoothly supplying a supercooled beverage.

A beverage dispenser of the present invention supplies a beverage brought into a supercooled state at a solidifying point or less and releases the supercooled state in the outside, and is characterized by comprising: a treatment device which deaerates raw water and/or filters the raw water through a reverse osmosis film; a primary cooling device which cools the raw water treated by the treatment device to an ice point or so; a raw water supply circuit which supplies the raw water cooled by the primary cooling device to the outside; a secondary cooling device which cools the raw water flowing through the raw water supply circuit into the supercooled state at the solidifying point or less; and a syrup circuit which supplies a syrup to the raw water supplied to the outside through the secondary cooling device.

A beverage dispenser of a second invention supplies a beverage brought into a supercooled state at a solidifying point or less and releases the supercooled state in the outside, and is characterized by comprising: a treatment device which deaerates raw water and/or filters the raw water through a reverse osmosis film; a beverage generation device which mixes the raw water treated by the treatment device with a syrup to generate the beverage; a primary cooling device which cools the beverage generated by the beverage generation device to an ice point or so; a beverage supply circuit which supplies the beverage cooled by the primary cooling device to the outside; and a secondary cooling device which cools the beverage flowing through the beverage supply circuit into the supercooled state at the solidifying point or less.

According to the present invention, the beverage dispenser which supplies the beverage brought into the supercooled state at the solidifying point or less and which releases the supercooled state in the outside comprises: the treatment device which deaerates the raw water and/or filters the raw water through the reverse osmosis film; the primary cooling device which cools the raw water treated by the treatment device to the ice point or so; the raw water supply circuit which supplies the raw water cooled by the primary cooling device to the outside; the secondary cooling device which cools the raw water flowing through the raw water supply circuit into the supercooled state at the solidifying point or less; and the syrup circuit which supplies the syrup to the raw water supplied to the outside through the secondary cooling device. In consequence, since the raw water is deaerated and/or filtered through the reverse osmosis film without being influenced by a type of the raw water for use, the supercooled state of the raw water can satisfactorily be formed.

Therefore, since the raw water can momentarily be phase-changed to ice owing to impact caused at a time when the supercooled raw water is discharged to the outside and the syrup is supplied to the raw water phase-changed to the ice by the syrup circuit, it is possible to serve the beverage in a finally served state which is a sherbet state.

According to the second invention, the beverage dispenser which supplies the beverage brought into the supercooled state at the solidifying point or less and which releases the supercooled state in the outside comprises: the treatment device which deaerates the raw water and/or filters the raw water through the reverse osmosis film; the beverage generation device which mixes the raw water treated by the treatment device with the syrup to generate the beverage; the primary cooling device which cools the beverage generated by the beverage generation device to the ice point or so; the beverage supply circuit which supplies the beverage cooled by the primary cooling device to the outside; and the secondary cooling device which cools the beverage flowing through the beverage supply circuit into the supercooled state at the solidifying point or less. In consequence, the supercooled state of the beverage generated by mixing the raw water deaerated and/or filtered through the reverse osmosis film with the syrup can satisfactorily be formed without being influenced by the type of the raw water for use.

Therefore, the beverage can momentarily be phase-changed to the ice owing to impact caused at a time when the supercooled beverage is discharged to the outside, and can be served as the beverage having the finally served state which is the sherbet state.

BEST MODE FOR CARRYING OUT THE INVENTION

Next, Embodiments 1 to 3 will be described as embodiments of the present invention in detail with reference to the drawings. A beverage dispenser 1 according to the embodiments is a dispenser for use in a restaurant, a coffee shop or the like, and is a device which supplies a targeted beverage, for example, a neutral beverage such as oolong tea or orange juice, a strongly carbonated drink, a weakly carbonated drink or a non-carbonated drink in a supercooled state and which serves a sherbet-like beverage in a container such as a cup.

Embodiment 1

Figure 1:
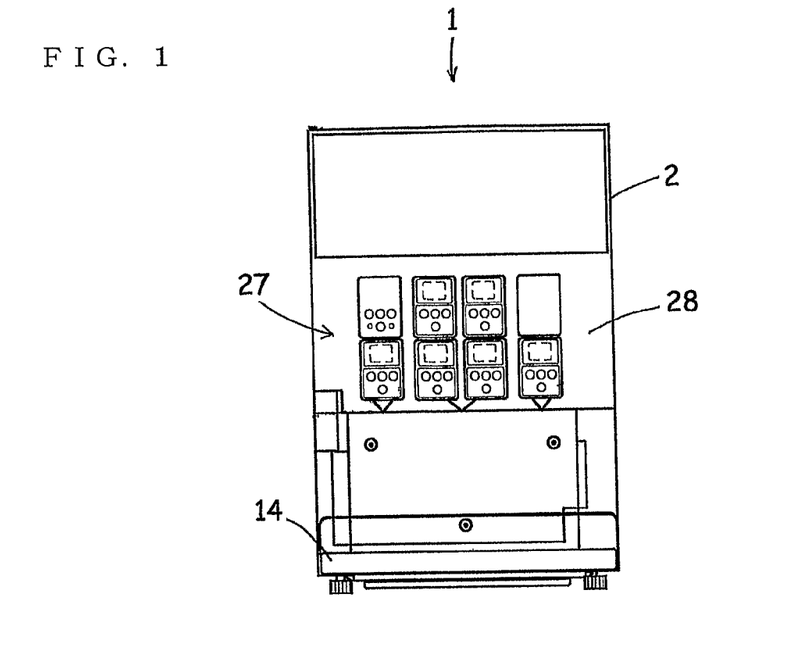
FIG. 1 is a front view of a main body of a beverage dispenser according to the present invention.
Figure 2:
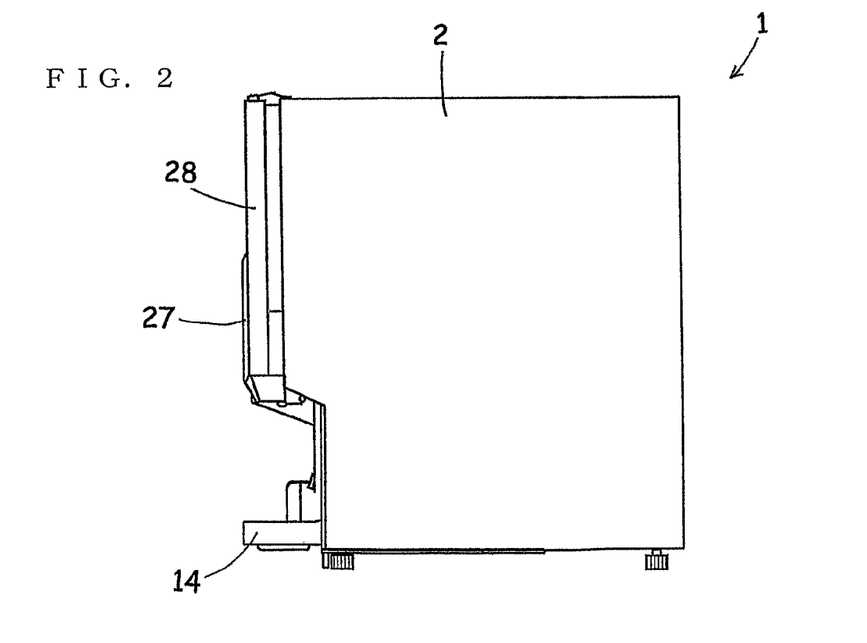
FIG. 2 is a side view of the main body of the beverage dispenser.
Figure 3:
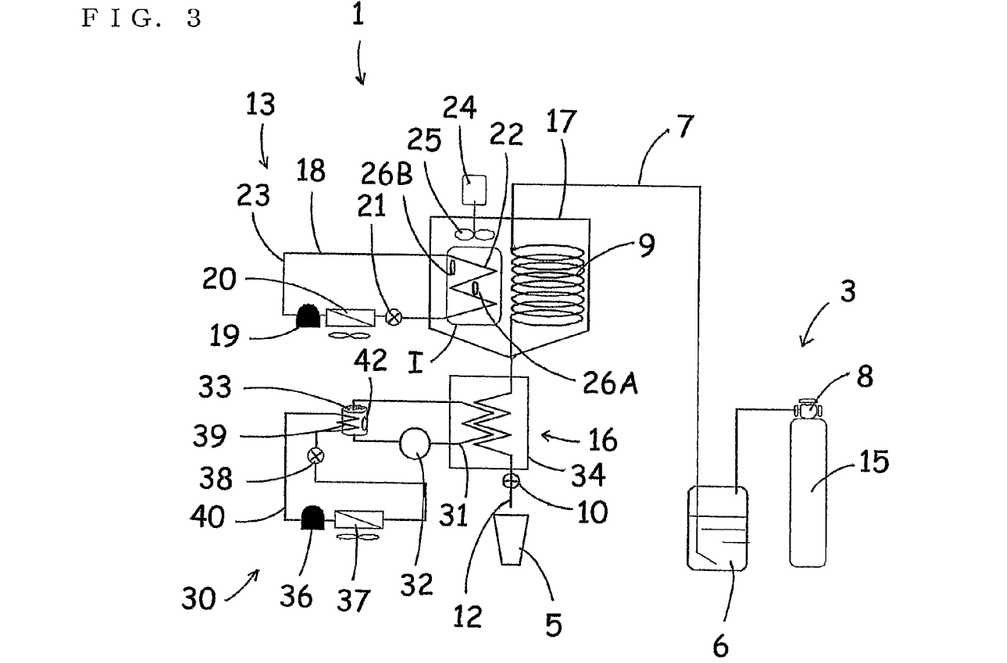
FIG. 3 is a schematic constitution diagram of a beverage dispenser (Embodiment 1)

First, a beverage dispenser according to Embodiment 1 will be described in detail with reference to FIGS. 1 to 3. FIG. 1 is a front view of a main body 2 of a beverage dispenser 1 in which the present invention is utilized, FIG. 2 is a side view of the main body 2 of the beverage dispenser 1, and FIG. 3 is a schematic constitution diagram of the beverage dispenser 1.

In the beverage dispenser 1 of the embodiment, a beverage supply unit 3 is disposed in the vicinity of the main body 2. At a front surface of an openable/closable door 28 of the main body 2, an operating section 27 is disposed which supplies a beverage from the beverage supply unit 3 and which is provided with operation buttons such as buttons S, M, L and C/P to select a beverage supply amount or a beverage supply method for each beverage to be supplied from the beverage supply unit 3. The buttons S, M and L are buttons which operate the supply of a predetermined amount of the beverage, and the button C/P is a button to supply the beverage only while the button is operated. It is assumed that the operating section 27 is connected to a control device 4 described later in detail.

Moreover, a nozzle 12 (shown in FIG. 3) for discharging the beverage from the beverage supply unit 3 is disposed at a lower rear portion of the openable/closable door 28, a table 14 is disposed under the nozzle 12, and a cup 5 can be disposed on the table 14.

The beverage supply unit 3 of the present embodiment includes a beverage tank 6 to store the beverage generated by regulating beforehand a concentration of a syrup which is a sugar liquid material or a sugar-free liquid material as a beverage material into a concentration suitable for serving a targeted beverage by use of a diluting liquid such as diluting water or soda water; a beverage supply circuit 7 which supplies the beverage from the beverage tank 6; a beverage cooling coil 9, a heat exchanger 16 for supercooling the beverage and a beverage electromagnetic valve 10. An end portion of the beverage supply circuit 7 is connected to the nozzle 12.

A gas regulator 8 as a pressure reduction valve constituting beverage feeding means is constantly opened. Therefore, when the beverage electromagnetic valve 10 disposed at the beverage supply circuit 7 is opened, a carbonic acid gas having a predetermined pressure is supplied from a carbonic acid gas cylinder 15, and the beverage is fed from the beverage tank 6 to the beverage supply circuit 7 at which the beverage cooling coil 9 is interposed.

The beverage cooling coil 9 cools the beverage to a temperature around an ice point by a primary cooling device 13. In the present embodiment, the primary cooling device 13 includes a water tank 17 to store cooling water and a refrigerant circuit 18 which cools the cooling water stored in the water tank 17 and which attaches ice of a predetermined ratio of the cooling water to a cooler 22. The refrigerant circuit 18 is constituted by annularly connecting a compressor 19 disposed in the main body 2, a condenser 20, an expansion valve 21 as pressure reduction means and the cooler 22 disposed so as to perform heat exchange between the cooler and the cooling water stored in the water tank 17 via a refrigerant pipe 23.

Moreover, in the water tank 17, a stirring propeller 25 is disposed which is driven by a stirring motor 24 to stir the cooling water stored in the water tank. Moreover, the water tank includes a first ice sensor 26A including a pair of conductors positioned internally from the cooler 22, and a second ice sensor 26B including a pair of conductors positioned outside the cooler 22. These ice sensors 26A, 26B output an ice detection signal, when the ice is interposed between the conductors and a resistance value is not less than a predetermined value.

On the other hand, the beverage supply circuit 7 connected to the beverage cooling coil 9 on a downstream side is provided with the heat exchanger 16 for supercooling the beverage. This heat exchanger 16 for supercooling the beverage cools the beverage at a supercooling temperature which is not more than a solidifying point by a secondary cooling device 30. In the present embodiment, the heat exchanger is constituted with a double pipe, and the double pipe is surrounded with an insulating material 34 or the like and constituted so that cold does not easily leak outwards.

Moreover, it is constituted that the beverage discharged from the beverage cooling coil 9 flows through an inner pipe of the double pipe. It is to be noted that in the present embodiment, the inner pipe of the double pipe has such a capacity as to be filled with about one cup of the beverage in terms of the cup 5, for example, about 200 ml of beverage.

In the present embodiment, the secondary cooling device 30 includes a brine circuit 31 through which an antifreezing liquid is circulated, and a refrigerant circuit 35 which cools the antifreezing liquid in the brine circuit 31 at the supercooling temperature which is not more than the solidifying point, for example, −5° C. to −10° C.

The brine circuit 31 is constituted by annularly connecting an antifreezing liquid circulation pump 32, the heat exchanger 16 for supercooling the beverage and an antifreezing liquid tank 33, and is filled with a predetermined amount of the antifreezing liquid. The present embodiment is constituted so that the antifreezing liquid flowing through the brine circuit 31 flows between an outer pipe and the inner pipe of the double pipe constituting the heat exchanger 16 for supercooling the beverage. In the present embodiment, the pipes are connected so that the antifreezing liquid is circulated in such a direction as to be opposite to a circulating direction of the beverage. In consequence, the antifreezing liquid enters the heat exchanger 16 for supercooling the beverage from the downstream side of the beverage supply circuit 7, and is discharged from the heat exchanger 16 on an upstream side of the beverage supply circuit 7.

The refrigerant circuit 35 is constituted by annularly connecting, via a refrigerant pipe 40, a compressor 36 disposed in the main body 2, a condenser 37, an expansion valve 38 as pressure reduction means and a cooler 39 disposed so as to perform heat exchange between the cooler and the antifreezing liquid of the antifreezing liquid tank 33. It is to be noted that in the present embodiment, a four-way valve 41 (shown in FIG. 4 only) capable of changing a channel of a refrigerant stored in the refrigerant circuit 35 is disposed so as to allow the refrigerant at a high temperature to enter the cooler 39.

Moreover, in the antifreezing liquid tank 33, a temperature sensor 42 is disposed which detects the temperature of the antifreezing liquid stored in the tank 33.

It is to be noted that FIG. 3 shows only one line of the beverage supply circuit 7 including the beverage tank 6, the beverage cooling coil 9, the heat exchanger 16 for supercooling the beverage and the beverage electromagnetic valve 10. However, the present invention is not limited to this embodiment. It is assumed that the beverage supply circuit 7 including the beverage tank 6, the beverage cooling coil 9, the heat exchanger 16 for supercooling the beverage and the beverage electromagnetic valve 10 is disposed for each type of beverage provided at the operating section 27. It is to be noted that in this case, the water tank 17 constituting the primary cooling device 13 is used in cooling the beverage cooling coils 9 of the circuits. The antifreezing liquid tank 33 constituting the secondary cooling device 30 may similarly be used in cooling the beverage supply circuits 7. However, it is preferable that the brine circuit 31 is disposed for each of the heat exchangers 16 for supercooling the beverage of the beverage supply circuits 7.

Figure 4:
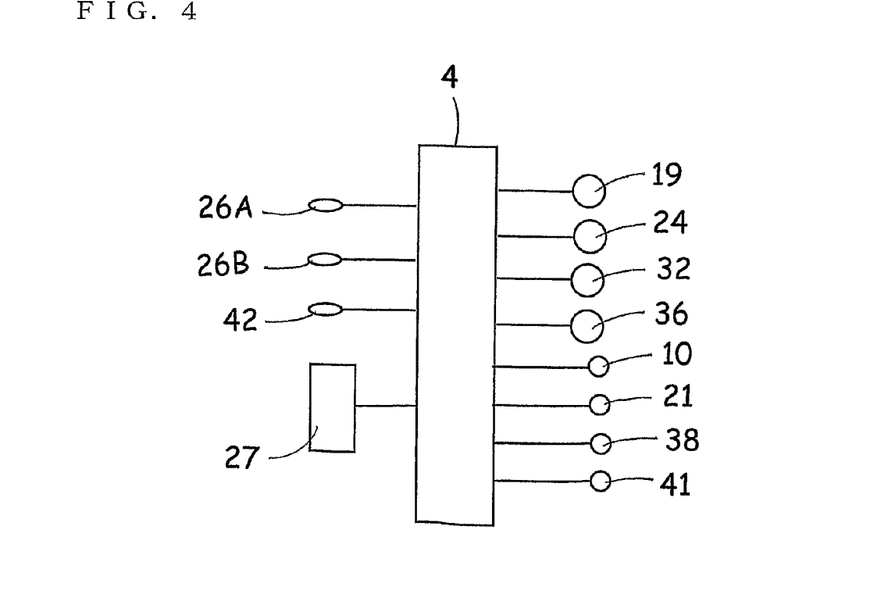
FIG. 4 is an electric block diagram of a control device.

Next, the control device 4 will be described with reference to an electric block diagram of FIG. 4. The control device 4 includes a microcomputer for general use, and is connected to the operating section 27, the first and second ice sensors 26A, 26B and the temperature sensor 42 on an input side. The control device 4 on an output side is connected to the beverage electromagnetic valves 10, the compressor 19, expansion valve 21 and stirring motor 24 constituting the primary cooling device 13, and the antifreezing liquid circulation pump 32, compressor 36, expansion valve 38 and four-way valve 41 constituting the secondary cooling device 30.

An operation of the beverage dispenser 1 constituted as described above will be described. First, the control device 4 achieves a beverage supply standby state, cools the cooling water stored in the water tank 17 of the primary cooling device 13, cools the antifreezing liquid stored in the antifreezing liquid tank 33 of the secondary cooling device 30, opens the beverage electromagnetic valves 10 and allows the beverage to enter the beverage supply circuits 7.

To cool the cooling water stored in the water tank 17, first the control device 4 operates the compressor 19 and the like of the primary cooling device 13, and allows the cooler 22 to perform a cooling function. In consequence, the refrigerant pipe constituting the cooler 22 cools the cooling water stored in the water tank 17, and further forms ice I on the surface of the cooler 22. Moreover, it is judged based on the ice detection signals of the ice sensors 26A, 26B whether or not the ice sufficiently covers the cooling water stored in the water tank 17. Based on this judgment, operations of the compressor 19 and the like of the primary cooling device 13 are controlled. Therefore, the beverage cooling coils 9 immersed into the cooling water stored in the water tank 17 are cooled to a temperature around the ice point, and the beverage circulated through the beverage cooling coil 9 is also cooled to the temperature around the ice point.

To cool the antifreezing liquid stored in the antifreezing liquid tank 33, first the control device 4 operates the compressor 36 and the like of the secondary cooling device 30, and allows the cooler 39 to perform the cooling function. In consequence, the antifreezing liquid stored in the antifreezing liquid tank 33 is cooled. Moreover, based on the detected temperature of the temperature sensor 42, the operations of the compressor 36 and the like of the secondary cooling device 30 are controlled so that the antifreezing liquid stored in the antifreezing liquid tank 33 is cooled at a predetermined cooling temperature of −5° C. to −8° C. in the present embodiment. Therefore, the antifreezing liquid stored in the antifreezing liquid tank 33 is constantly cooled at the cooling temperature of −5° C. to −8° C.

After it is detected that the cooling water stored in the water tank 17 is cooled to the temperature around the ice point and that the antifreezing liquid stored in the antifreezing liquid tank 33 is cooled at a temperature suitable for the supercooling of the beverage, for example, −5° C. to −8° C., the control device 4 achieves a state in which the beverage can be sold, that is, a state in which the operation button provided at the operating section 27 to supply each beverage can be operated.

When one of the operation buttons provided at the operating section 27 is operated in such a state, the antifreezing liquid circulation pump 32 of the brine circuit 31 to cool the corresponding beverage supply circuit 7 is driven. After delay of a predetermined time (a heat exchanger cooling standby time) of, for example, about five seconds from a time when the antifreezing liquid circulation pump 32 is driven, the corresponding beverage electromagnetic valve 10 is opened.

In consequence, the beverage circulated through the inner pipe of the double pipe constituting the heat exchanger 16 for supercooling the beverage performs heat exchange between the beverage and the antifreezing liquid circulated through the brine circuit 31 and cooled at the supercooling temperature of −5° C. to −8° C. in a passing process. In consequence, the beverage is cooled at the supercooling temperature of the beverage.

It is to be noted that, as in the present embodiment, after a beverage supply instruction is given, the antifreezing liquid circulation pump 32 is first driven until the heat exchanger cooling standby time elapses, and the beverage electromagnetic valve 10 is opened after delay. In consequence, the beverage which is circulated through the heat exchanger 16 for supercooling the beverage and with which the beverage supply circuit 7 is to be filled can appropriately be cooled at the beverage supercooling temperature of −5° C. to −8° C.

The beverage cooled at the supercooling temperature of the beverage is supercooled in the heat exchanger 16 for supercooling the beverage. Therefore, the beverage is momentarily phase-changed to the ice owing to impact caused in injecting the beverage from the nozzle 12 to the cup 5, and the beverage is served in a finally served state which is a sherbet state.

At this time, the beverage electromagnetic valve 10 is opened. Since the gas regulator 8 as the pressure reduction valve is constantly opened, the carbonic acid gas having a predetermined pressure is supplied from the carbonic acid gas cylinder 15, and the beverage stored in the beverage tank 6 is fed to the beverage supply circuit 7 provided with the beverage cooling coil 9.

Therefore, the beverage stored in the beverage tank 6 enters the beverage cooling coil 9, and performs heat exchange between the beverage and the cooling water stored in the water tank 17 in the beverage cooling coil 9. In consequence, the beverage is cooled to the ice point or so. At this time, since the beverage enters the beverage cooling coil 9 from the beverage tank 6, the beverage with which the beverage cooling coil 9 is filled is pushed into the heat exchanger 16 for supercooling the beverage, and such a standby state as to prepare for the next supply of the beverage is obtained.

According to such a constitution, the beverage cooled to the temperature around the ice point in the water tank 17 of the primary cooling device 13 performs the heat exchange between the beverage and the antifreezing liquid cooled at the solidifying point or less of the beverage in the heat exchanger 16 for supercooling the beverage. In consequence, the beverage can efficiently be cooled into the supercooled state at the solidifying point or less in a short time. Therefore, the supercooled state of the beverage discharged from the nozzle 12 is released owing to the impact caused in injecting the beverage into the cup 5, and the beverage is momentarily phase-changed to the ice and can be served in the finally served state which is the sherbet state.

Especially in the present embodiment, since the heat exchanger 16 for supercooling the beverage is constituted with the double pipe, it is possible to improve a heat exchange property between the beverage flowing through the beverage supply circuit 7 and the antifreezing liquid flowing through the brine circuit 31 while realizing miniaturization of the device.

Moreover, the present embodiment is constituted so that the antifreezing liquid flows through the brine circuit 31 to cool the beverage flowing through the beverage supply circuit 7. Therefore, the device can be miniaturized as compared with a case where a water tank of the antifreezing liquid is used.

It is to be noted that in the present embodiment, the heat exchanger 16 for supercooling the beverage is constituted with the double pipe, but instead of this line, a plate type heat exchanger may be used.

Furthermore, the beverage and the antifreezing liquid flow through the heat exchanger 16 for supercooling the beverage in a manner of counter flow. In consequence, it is possible to further improve efficiency of the heat exchange between the beverage flowing through the beverage supply circuit 7 and the antifreezing liquid flowing through the brine circuit 31, and improvement of a cooling performance can be realized.

In addition, in a case where a time required for discharging a predetermined amount, that is, one cup of the beverage in terms of the cup 5 elapses after the beverage electromagnetic valve 10 is opened, the control device 4 closes the beverage electromagnetic valve 10 and stops the antifreezing liquid circulation pump 32 of the driven brine circuit 31.

In consequence, to serve the beverage, when the antifreezing liquid is circulated through the brine circuit 31, the beverage does not have to be maintained in the supercooled state for a long time, and probability of generation of an ice nucleus can be reduced. Therefore, it is possible to avoid a disadvantage that the beverage is frozen in the heat exchanger 16 for supercooling the beverage on standby for the serving of the beverage. In consequence, the supercooled beverage can appropriately and smoothly be supplied.

It is to be noted that the operation of the antifreezing liquid circulation pump 32 of the brine circuit 31 is stopped at a time other than a beverage serving time in principle. However, to insulate the whole heat exchanger 16 for supercooling the beverage, the liquid may be circulated at a slight flow rate, or the pump may intermittently be operated.

It is to be noted that, if the supercooled state of the beverage in the heat exchanger 16 for supercooling the beverage is released owing to some influence, for example, an influence of a type of beverage, a difference between the solidifying point and the supercooling temperature, a material, a shape or surface roughness of a member such as the beverage cooling pipe which directly comes in contact with the beverage or the like and the beverage is frozen in the heat exchanger 16 for supercooling the beverage, the control device 4 executes thawing control.

During the thawing control, the control device 4 controls the four-way valve 41, and a high-temperature gas refrigerant discharged from the compressor 36 of the refrigerant circuit 35 of the secondary cooling device 30 is allowed to enter the cooler 39 without flowing through the condenser 37 or the expansion valve 38. In consequence, when the high-temperature gas refrigerant enters the cooler 39, the antifreezing liquid of the antifreezing liquid tank 33 is heated, and the antifreezing liquid circulation pump 32 is driven to circulate the heated antifreezing liquid through the brine circuit 31. Therefore, the beverage frozen in the beverage supply circuit 7 which performs the heat exchange between the beverage and the antifreezing liquid of the brine circuit 31 in the heat exchanger 16 for supercooling the beverage is heated. In consequence, the beverage in such a beverage supply circuit 7 is thawed.

Since the constitution to circulate the antifreezing liquid is adopted in a limited circuit such as the brine circuit 31, the temperature of the antifreezing liquid can easily be controlled. Even in a case where the supercooled state of the beverage of the beverage supply circuit 7 which performs the heat exchange between the beverage and the antifreezing liquid of the brine circuit 31 is released to freeze the beverage, the frozen beverage can easily be thawed, and the closing of the beverage supply circuit 7 can be released. In consequence, the supercooled beverage can appropriately and smoothly be supplied.

It is to be noted that, in the present embodiment, a hot gas of the refrigerant circuit 40 is used as heating means of the beverage frozen in the beverage supply circuit 7 of the heat exchanger 16 for supercooling the beverage, but the present invention is not limited this embodiment. The heat exchanger 16 for supercooling the beverage may be provided with an electric heater or the like to thaw the frozen beverage.

Moreover, according to such an embodiment, in the heat exchanger 16 for supercooling the beverage, the antifreezing liquid separately cooled by the cooler 39 of the refrigerant circuit 40 is circulated through the brine circuit 31, and the heat exchange is performed between the brine circuit 31 and the beverage supply circuit 7 to cool the beverage at the supercooling temperature. However, the present invention is not limited to the indirectly cooling method. The cooler 39 of the refrigerant circuit 40 may be disposed at the heat exchanger 16 for supercooling the beverage to directly cool the beverage supply circuit 7 of the heat exchanger 16 for supercooling the beverage by the refrigerant circulated through the cooler 39.

In such a case, if the beverage is frozen in the beverage supply circuit 7 of the heat exchanger 16 for supercooling the beverage, the high-temperature refrigerant is allowed to enter the cooler 39, and the beverage is thawed.

Embodiment 2

Next, a beverage dispenser 51 according to Embodiment 2 will be described with reference to a schematic constitution diagram of the beverage dispenser 51 in FIG. 5. It is to be noted that, in FIG. 5, components denoted with the same reference numerals as those of FIG. 3 produce the same effect and perform the same function. Therefore, description thereof is omitted.

The beverage dispenser 51 according to such an embodiment includes a syrup tank 52 to store a syrup as a sugar liquid material or a sugar-less liquid material which is a beverage material, a syrup circuit 53 which supplies the syrup from the syrup tank 52, a gas regulator 55 which feeds the syrup from the syrup tank 52 to the syrup circuit 53, a filter 58 which filters raw water as the beverage material for diluting the syrup into a concentration suitable for serving a targeted beverage, a raw water supply circuit 59 which supplies the raw water, a raw water treatment device 63 which treats the raw water flowing through the raw water supply circuit 59, a raw water cooling coil 60, and a heat exchanger 61 for supercooling the raw water. In the syrup circuit 53, a syrup electromagnetic valve 54 is interposed, and an end portion of the valve is connected to a nozzle 56. On the other hand, in the raw water supply circuit 59, a raw water electromagnetic valve 62 is interposed, and an end portion of the valve is connected to a nozzle 12.

It is to be noted that the gas regulator 55 as a pressure reduction valve is constantly opened. Therefore, when the syrup electromagnetic valve 54 disposed at the syrup circuit 53 is opened, a carbonic acid gas having a predetermined pressure is supplied from a carbonic acid gas cylinder 15, and the syrup stored in the syrup tank 52 is fed to the nozzle 56 via the syrup circuit 53.

The raw water treatment device 63 is means for deaerating the raw water to be supplied and/or filtering the raw water through a reverse osmosis film, and is a device which removes impurities from tap water to be supplied as the raw water.

The raw water cooling coil 60 cools the raw water treated by the raw water treatment device 63 to a temperature around an ice point by a primary cooling device 13. It is to be noted that, since a constitution of the primary cooling device 13 is similar to that of the above embodiment, description thereof is omitted. For this cooling water of a water tank 17 constituting this primary cooling device 13, in addition to the raw water cooling coil 60, the syrup circuit 53 is disposed so as to perform heat exchange.

Moreover, the raw water supply circuit 59 connected to the raw water cooling coil 60 on a downstream side is provided with the heat exchanger 61 for supercooling the raw water. Since this heat exchanger 61 for supercooling the raw water has a constitution similar to that of a heat exchanger 16 for supercooling a beverage of the above embodiment, description thereof is omitted.

Figure 5:
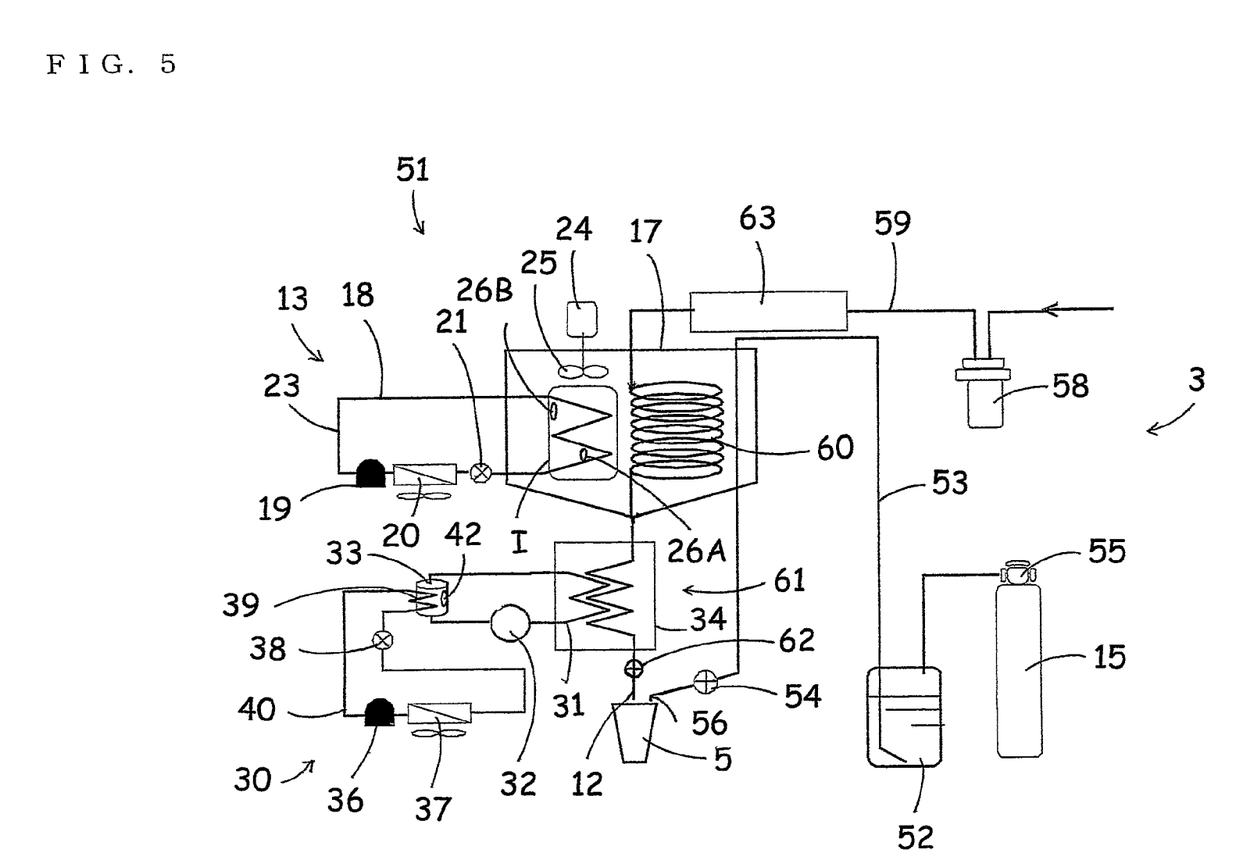
FIG. 5 is a schematic constitution diagram of a beverage dispenser (Embodiment 2)

It is to be noted that FIG. 5 shows only one line of syrup circuit 53 including the syrup tank 52 a syrup electromagnetic valve 54, but the present invention is not limited to this embodiment. It is assumed that the syrup circuit 53 including the syrup tank 52 and the syrup electromagnetic valve 54 is disposed for each type of beverage provided at an operating section 27. It is to be noted that, in this case, since the raw water for use as a diluting liquid in each syrup for providing a targeted beverage is common, only one line of raw water supply circuit 59 may be disposed.

An operation of the beverage dispenser 51 constituted as described above will be described. First, a control device achieves a beverage supply standby state, cools the cooling water stored in the water tank 17 of the primary cooling device 13, cools an antifreezing liquid stored in an antifreezing liquid tank 33 of a secondary cooling device 30, opens each syrup electromagnetic valve 54 to allow the syrup to enter the syrup circuit 53, and further opens the raw water electromagnetic valve 62 to allow the raw water to enter the raw water supply circuit 59.

After the control device detects that the cooling water stored in the water tank 17 is cooled to the temperature around the ice point and the antifreezing liquid stored in the antifreezing liquid tank 33 is cooled at a temperature of −5° C. to −8° C. suitable for supercooling the beverage, the device achieves a beverage sellable state, that is, a state in which an operation button provided at the operating section 27 to supply each beverage can be operated.

When one of the operation buttons provided at the operating section 27 is operated in such a state, an antifreezing liquid circulation pump 32 of a brine circuit 31 to cool the raw water supply circuit 59 is driven. After delay of a predetermined time (a heat exchanger cooling standby time) of, for example, about five seconds from a time when the antifreezing liquid circulation pump 32 is driven, the raw water electromagnetic valve 62 and the corresponding beverage electromagnetic valve 54 are opened.

In consequence, the raw water circulated through an inner pipe of a double pipe constituting the heat exchanger 61 for supercooling the raw water performs heat exchange between the raw water and the antifreezing liquid circulated through the brine circuit 31 and cooled at the supercooling temperature of −5° C. to −8° C. in a passing process. In consequence, the raw water is cooled at the supercooling temperature.

The raw water cooled at the supercooling temperature is supercooled in the heat exchanger 61 for supercooling the raw water. Therefore, the water is momentarily phase-changed to ice owing to impact caused in injecting the water from the nozzle 12 to a cup 5. Simultaneously with the supply of the raw water, the syrup is supplied from the nozzle 12 to the cup 5. In consequence, the beverage is served in a finally served state which is a sherbet state.

At this time, when the raw water electromagnetic valve 62 is opened, the raw water is fed to the raw water supply circuit 59 provided with the raw water cooling coil 60. The raw water enters the raw water cooling coil 60, and performs heat exchange between the cooling water stored in the water tank 17 and the raw water circulated through the raw water cooling coil 60. In consequence, the raw water is cooled to the ice point or so. At this time, since the beverage enters the raw water cooling coil 60, the raw water with which the raw water cooling coil 60 is filled is pushed into the heat exchanger 61 for supercooling the raw water, and such a standby state as to prepare for the next supply of the beverage is obtained.

According to such a constitution, the raw water cooled to the temperature around the ice point by the water tank 17 of the primary cooling device 13 performs the heat exchange between the raw water and the antifreezing liquid cooled at a solidifying point or less in the heat exchanger 61 for supercooling the raw water. In consequence, the raw water can efficiently be cooled into the supercooled state at the solidifying point or less in a short time. Therefore, the supercooled state of the raw water discharged from the nozzle 12 is released owing to the impact of the injection into the cup 5, and the beverage is momentarily phase-changed to the ice and can be served in the finally served state which is the sherbet state.

Figure 6:
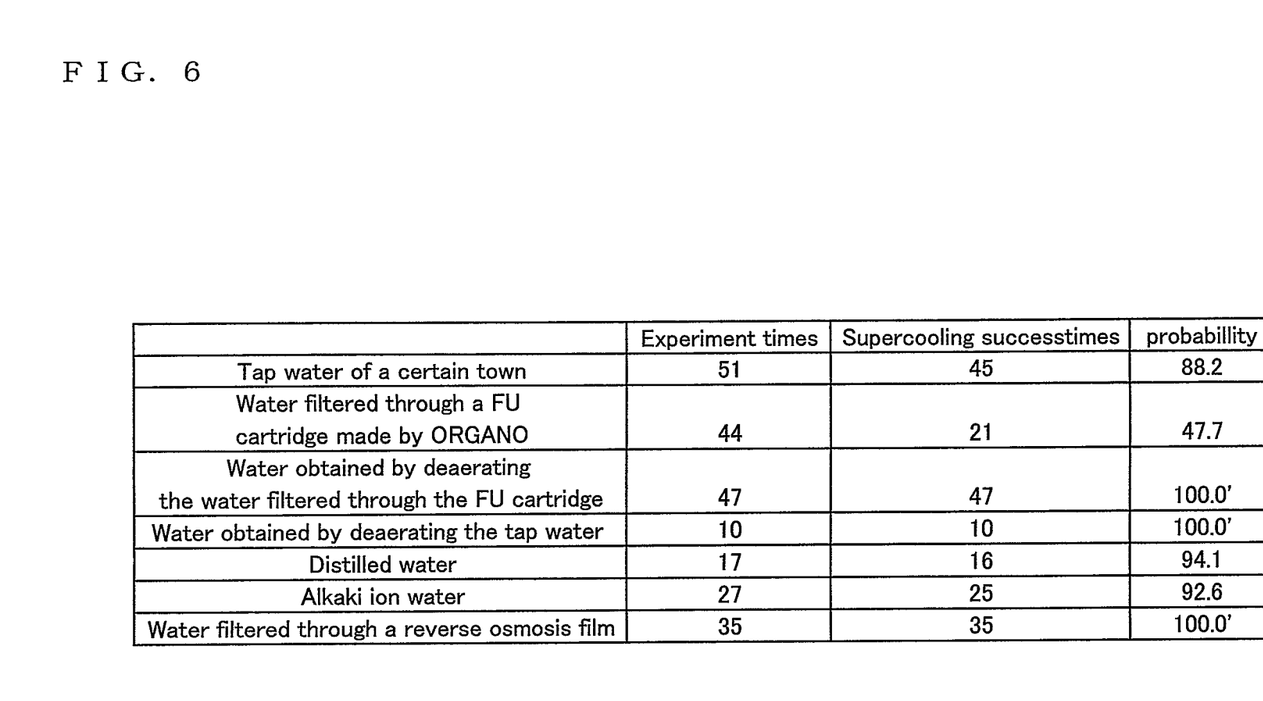
FIG. 6 is a diagram showing an experiment result concerning the presence of generation of a supercooling phenomenon in accordance with a type of raw water.

Here, FIG. 6 shows an experiment result concerning the presence of generation of a supercooling phenomenon in accordance with a type of raw water. Examples of the raw water as an experiment target include tap water of a certain town, water filtered through a cartridge, water obtained by deaerating the water filtered through the cartridge, water obtained by deaerating the tap water, distilled water, alkali ion water and water filtered through a reverse osmosis film. These examples were subjected to the experiment of the presence of the generation of the supercooling phenomenon by the beverage dispenser 51 according to such an embodiment.

According to this experiment, in a case where raw water such as the tap water or the water filtered through the cartridge was used as it was, a probability that the heat exchanger 61 for supercooling the raw water could shift to the supercooling temperature was 90% or less. In a case where the distilled water or the alkali ion water was used as the raw water, a probability that the heat exchanger could shift to the supercooling temperature was 95% or less.

On the other hand, in a case where the raw water obtained by deaerating the tap water or the water filtered through the cartridge or the raw water filtered through the reverse osmosis film was used, a probability that the heat exchanger could shift to the supercooling temperature was 100%.

According to the above experiment result, the supercooling phenomenon itself is an unstable phenomenon. However, according to such an embodiment, the raw water is deaerated and/or filtered in the raw water treatment device 63. Therefore, the supercooled state of the raw water can satisfactorily be formed without being influenced by the type of raw water for use.

Therefore, the raw water can momentarily be phase-changed to the ice owing to the impact caused at a time when the supercooled raw water is discharged to the outside. When the syrup is supplied to the raw water phase-changed to the ice by the syrup circuit 53, the beverage having the finally served state which is the sherbet state can securely be served. In consequence, it is possible to avoid a disadvantage that the beverage is frozen in the pipe and is not discharged, and reliability of the device is improved.

Embodiment 3

Next, a beverage dispenser 71 according to Embodiment 3 will be described with reference to a schematic constitution diagram of the beverage dispenser 71 in FIG. 7. It is to be noted that, in FIG. 7, components denoted with the same reference numerals as those of FIG. 3 or 5 produce the same effect and perform the same function. Therefore, description thereof is omitted.

In the beverage dispenser 71 according to such an embodiment, raw water as a diluting liquid to be supplied to a beverage tank 76 is deaerated and/or treated through a reverse osmosis film by a raw water treatment device 63 in the same manner as in Embodiment 2 described above.

That is, a beverage supply unit 3 according to such an embodiment includes a syrup tank 72 to store a syrup as a sugar liquid material or a sugar-less liquid material which is a beverage material, a syrup supply line 73 which supplies the syrup from the syrup tank 72 to the beverage tank 76, a gas regulator 75 which feeds the syrup from the syrup tank 72 to the syrup supply line 73, a filter 85 which filters the raw water as the beverage material for diluting the syrup into a concentration suitable for serving a targeted beverage, a raw water supply line 80 which supplies the raw water, the raw water treatment device 63 which treats the raw water flowing through the raw water supply line 80, the beverage tank 76 to store a beverage generated by regulating the beverage into the concentration suitable for serving the targeted beverage by use of the raw water to be supplied via the raw water treatment device 63 and the syrup to be supplied from the syrup tank 72, a beverage supply circuit 7 which supplies the beverage from the beverage tank 76, the gas regulator 75 which feeds the beverage from the beverage tank 76 to the beverage supply circuit 7, a beverage cooling coil 9, a heat exchanger 16 for supercooling the beverage, and a beverage electromagnetic valve 10.

It is to be noted that at the syrup supply line 73, a syrup electromagnetic valve 74 controlled to open or close by a control device is interposed. Moreover, at the raw water supply line 80, a raw water electromagnetic valve 81 similarly controlled to open or close by the control device is interposed. The gas regulator 75 is connected to a gas supply line 77 at which a gas electromagnetic valve 78 is interposed. When the gas electromagnetic valve 78 and the syrup electromagnetic valve 74 are controlled to open or close, the beverage can be fed from the beverage tank 76 to the beverage supply circuit 7.

Moreover, in the beverage tank 76, a stirring propeller 83 is disposed which is driven by a stirring motor 82 to stir the raw water and the syrup stored in the tank. Moreover, an exhaust valve 84 is disposed which discharges a supplied gas from the tank.

Figure 7:
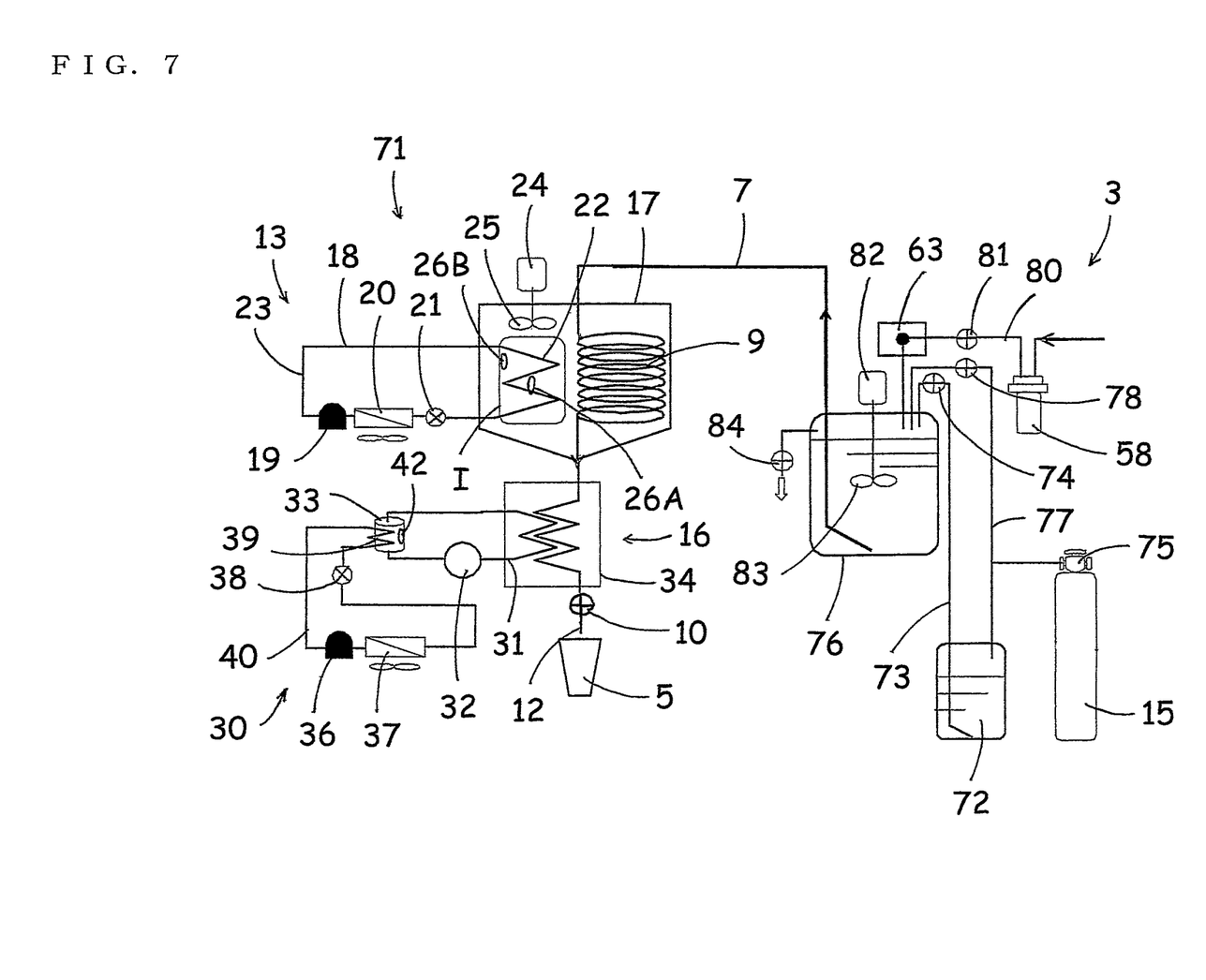
FIG. 7 is a schematic constitution diagram of a beverage dispenser (Embodiment 3).

It is to be noted that FIG. 7 shows only one line of the beverage supply circuit 7 including the beverage tank 76, the beverage cooling coil 9, the heat exchanger 16 for supercooling the beverage and the beverage electromagnetic valve 10. However, the present invention is not limited to this embodiment. It is assumed that the beverage supply circuit 7 including the beverage tank 76, the beverage cooling coil 9, the heat exchanger 16 for supercooling the beverage and the beverage electromagnetic valve 10 is disposed for each type of beverage provided at an operating section 27. Therefore, it is assumed that the syrup supply line 73 and the syrup tank 72 which supply the syrup to each beverage tank 76 are similarly disposed for each type of beverage.

An operation of the beverage dispenser 71 constituted as described above will be described. First, the control device achieves a beverage supply standby state, cools the cooling water stored in the water tank 17 of the primary cooling device 13, and cools an antifreezing liquid stored in an antifreezing liquid tank 33 of a secondary cooling device 30. The control device opens the syrup electromagnetic valve 74 and the raw water electromagnetic valve 81 to supply, to the beverage tank 76, the syrup and the raw water deaerated and/or filtered through the reverse osmosis film, and generates the targeted beverage. Subsequently, the control device opens the beverage electromagnetic valve 10 to allow the beverage to enter each beverage supply circuit 7.

When one of the operation buttons provided at the operating section 27 is operated in a beverage sellable state in the same manner as in Embodiment 1 described above, an antifreezing liquid circulation pump 32 of a brine circuit 31 to cool the corresponding beverage supply circuit 7 is driven.

After delay of a predetermined time (a heat exchanger cooling standby time) of, for example, about five seconds from a time when the antifreezing liquid circulation pump 32 is driven, the corresponding beverage electromagnetic valve 10 is opened.

In consequence, the beverage circulated through an inner pipe of a double pipe constituting the heat exchanger 16 for supercooling the beverage performs heat exchange between the beverage and the antifreezing liquid circulated through the brine circuit 31 and cooled at a supercooling temperature of −5° C. to −8° C. in a passing process. In consequence, the beverage is cooled at the supercooling temperature.

The beverage cooled at the supercooling temperature of the beverage is supercooled in the heat exchanger 16 for supercooling the beverage. Therefore, the beverage is momentarily phase-changed to ice owing to impact caused in injecting the beverage from a nozzle 12 to a cup 5, and the beverage is served in a finally served state which is a sherbet state.

Even in the present embodiment, the raw water for use as the diluting liquid of the beverage is the raw water deaerated and/or filtered through the reverse osmosis film in the same manner as in Embodiment 2 described above. Therefore, the beverage can momentarily be phase-changed to the ice owing to the impact caused at a time when the supercooled raw water is discharged to the outside, and the beverage having the finally served state which is the sherbet state can securely be served. In consequence, reliability of the device is improved.

It is to be noted that in the embodiments described above, a non-carbonated supercooled beverage is manufactured by use of the cooling water or the raw water deaerated and/or filtered through the reverse osmosis film as the diluting liquid. However, a strongly or weakly carbonated supercooled beverage can be served using soda water, when the cooling water or the raw water deaerated and/or filtered through the reverse osmosis film is used as the diluting liquid.

The invention claimed is:

1. A beverage dispenser which supplies a beverage brought into a supercooled state at a solidifying point or less and which releases the supercooled state in the outside, comprising:
   a treatment device that deaerates raw water;
   a primary cooling device that cools the raw water treated by the treatment device to an ice point or so;
   a raw water supply circuit that supplies the raw water cooled by the primary cooling device to the outside;
   a secondary cooling device that cools the raw water flowing through the raw water supply circuit into the supercooled state at a solidifying point or less; and
   a syrup circuit that supplies a syrup to the raw water supplied to the outside through the secondary cooling device,
   wherein the treatment device further filters the raw water through a reverse osmosis film, and the secondary cooling device comprises a double pipe heat exchanger including an inner pipe and an outer pipe.

2. A beverage dispenser which supplies a beverage brought into a supercooled state at a solidifying point or less and which releases the supercooled state in the outside, comprising:
   a treatment device that deaerates raw water;
   a beverage generation device that mixes the raw water treated by the treatment device with a syrup to generate the beverage;
   a primary cooling device that cools the beverage generated by the beverage generation device to an ice point or so;
   a beverage supply circuit that supplies the beverage cooled by the primary cooling device to the outside;
   a secondary cooling device that cools the beverage flowing through the beverage supply circuit into the supercooled state at a solidifying point or less;
   a water tank that stores cooling water;
   a cooler that cools the cooling water by a refrigerant circuit of the primary cooling device; and
   first and second ice sensors that provide an ice detection signal when ice is interposed between the sensors.

3. The beverage dispenser of claim 1, wherein the secondary cooling device further comprises:
   an anti-freezing liquid tank filled with a predetermined amount of anti-freezing liquid;
   a temperature sensor of the anti-freezing liquid tank;
   a refrigerant circuit that cools the anti-freezing liquid in the anti-freezing liquid tank to a supercooling temperature less than about −5 degrees centigrade, based on a temperature detected by the temperature sensor; and
   a brine circuit that circulates the anti-freezing liquid.

4. The beverage dispenser of claim 3, wherein the brine circuit circulates the anti-freezing liquid to an outer pipe of the double pipe heat exchanger.

5. The beverage dispenser of claim 3, further comprising a control device configured to, after a beverage supply instruction is given, circulate the anti-freezing liquid through the brine circuit and, after a heat exchanger cooling standby time elapses, open a beverage valve.

6. The beverage dispenser of claim 1, further comprising:
   a water tank that stores cooling water;
   a cooler that cools the cooling water by a refrigerant circuit of the primary cooling device; and
   first and second ice sensors that provide an ice detection signal when ice is interposed between the sensors.

7. The beverage dispenser of claim 6, further comprising a control device that operates the primary cooling device based on the ice detection signal.

8. The beverage dispenser of claim 2, wherein the treatment device further filters the raw water through a reverse osmosis film, and the secondary cooling device comprises a double pipe heat exchanger including an inner pipe and an outer pipe.

9. The beverage dispenser of claim 8, wherein the secondary cooling device further comprises:
   an anti-freezing liquid tank filled with a predetermined amount of anti-freezing liquid;
   a temperature sensor of the anti-freezing liquid tank;
   a refrigerant circuit that cools the anti-freezing liquid in the anti-freezing liquid tank to a supercooling temperature less than about −5 degrees centigrade, based on a temperature detected by the temperature sensor; and
   a brine circuit that circulates the anti-freezing liquid.

10. The beverage dispenser of claim 9, wherein the brine circuit circulates the anti-freezing liquid to an outer pipe of the double pipe heat exchanger.

11. The beverage dispenser of claim 9, further comprising a control device configured to, after a beverage supply instruction is given, circulate the anti-freezing liquid through the brine circuit and, after a heat exchanger cooling standby time elapses, open a beverage valve.

12. The beverage dispenser of claim 2, further comprising a control device that operates the primary cooling device based on the ice detection signal.

13. A beverage dispenser which supplies a beverage brought into a supercooled state, comprising:
   a treatment device that deaerates raw water;
   a primary cooling device that cools the raw water treated by the treatment device to an ice point or so; and a secondary cooling device including a double pipe heat exchanger that cools the raw water cooled to the ice point or so into the supercooled state at a solidifying point or less.

14. The beverage dispenser of claim 13, wherein the secondary cooling device further comprises:
an anti-freezing liquid tank filled with a predetermined amount of anti-freezing liquid;
a temperature sensor of the anti-freezing liquid tank;
a refrigerant circuit that cools the anti-freezing liquid in the anti-freezing liquid tank to a supercooling temperature less than about −5 degrees centigrade, based on a temperature detected by the temperature sensor; and
a brine circuit that circulates the anti-freezing liquid.

15. The beverage dispenser of claim 14, wherein the brine circuit circulates the anti-freezing liquid to an outer pipe of the double pipe heat exchanger.

16. The beverage dispenser of claim 14, further comprising a control device configured to, after a beverage supply instruction is given, circulate the anti-freezing liquid through the brine circuit and, after a heat exchanger cooling standby time elapses, open a beverage valve.

17. The beverage dispenser of claim 13, further comprising:
a water tank that stores cooling water;
a cooler that cools the cooling water by a refrigerant circuit of the primary cooling device; and
first and second ice sensors that provide an ice detection signal when ice is interposed between the sensors.

18. The beverage dispenser of claim 17, further comprising a control device that operates the primary cooling device based on the ice detection signal.

* * * * *